United States Patent

[11] 3,575,508

[72] Inventors Berthold Fergg; Wolfgang Zahn; Walter Knapp, Munich, Germany

[21] Appl. No. 752,896

[22] Filed Aug. 15, 1968

[45] Patented Apr. 20, 1971

[73] Assignee AGFA-Gevaert Aktiengesellschaft Leverkusen, Germany

[32] Priority Sept. 16, 1967

[33] Germany

[31] P 15 97 072.6

[54] EXPOSURE TIME CONTROL ARRANGEMENT
11 Claims, 1 Drawing Fig.

[52] U.S. Cl. .......... 355/88, 355/35, 355/38

[51] Int. Cl. .......... G03b 27/04

[50] Field of Search .......... 355/88, 83, 67, 71, 35, 38

[56] References Cited

UNITED STATES PATENTS

| | | | |
|---|---|---|---|
| 3,120,782 | 2/1964 | Goddard et al. .............. | 355/88(X) |
| 3,293,033 | 12/1966 | Maddock et al. ............ | 355/38(X) |

*Primary Examiner*—Samuel S. Matthews
*Assistant Examiner*—Richard L. Moses
*Attorney*—Michael S. Striker

ABSTRACT: Photo sensitive material is illuminated through a color original. Three secondary electron multipliers furnish currents proportional to the light illuminating the photo sensitive material, one for each of three colors. Each current charges a capacitor. One terminal of each of the capacitors is connected to the corresponding secondary electron multiplier, and is also connected to a potentiometer. The other terminals of all three potentiometers are connected to a common point. The voltage at the wiper arm of each potentiometer is compared to a corresponding reference voltage. Illumination in a given color is terminated when the voltage at the wiper arm and the corresponding reference voltage have a predetermined relationship.

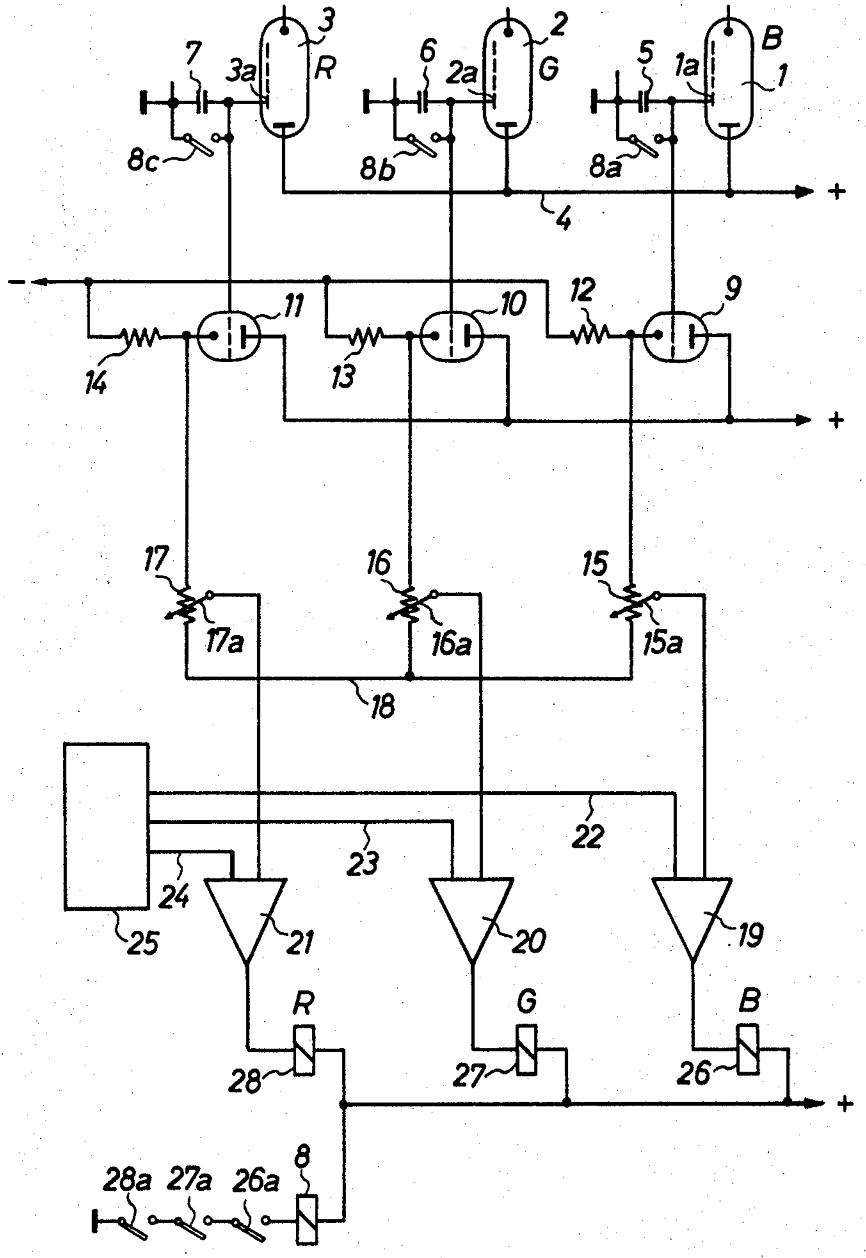
INVENTOR.
BERTHOLD FERGG
WOLFGANG ZAHN
WALTER KNAPP
BY Michael S. Striker
Attorney

EXPOSURE TIME CONTROL ARRANGEMENT

BACKGROUND OF THE INVENTION

This invention relates to an arrangement for controlling the exposure time in a color printer. In particular it relates to an arrangement for separately controlling the exposure time in each of a plurality of colors. In known arrangements of this type, comprising for example three color channels, each of these color channels is equipped with a capacitor for integrating currents corresponding to the amount of light falling on the light-sensitive copying material in a particular color. The charge on the capacitor then corresponds to the total amount of light furnished during a particular exposure. When this total amount of light has reached a predetermined value in a given color, the exposure in that color is terminated.

In the above-described known arrangements the conditions for terminating the exposure in each of the three colors are generally determined in such a manner that a neutral gray would result if the total amount of light for each color were evenly distributed over the surface of the copy. This so-called neutral gray compensation has the advantage, that substantially uncolored pictures are correctly reproduced independent of the tonal gradations of the negative or positive material. Furthermore, a picture wherein the colors together constitute substantially a neutral gray is particularly pleasing to the eye. Therefore to a certain extent a color copy is still satisfactory, even if one color predominates slightly but is not rendered in the copy. Only in the presence of a strong dominant color in the photographed picture, that is in the presence of a relatively large uniformly colored surface, does neutral gray compensation result in unsatisfactory reproductions since these dominant colors are suppressed.

SUMMARY OF THE INVENTION

It is well known that the above-mentioned defects in neutral gray compensation may be partially eliminated by means of a so-called undercorrection. In such an undercorrection the density differences in the individual colors in the original are only partially compensated. It is an object of this invention to furnish an arrangement for individually controlling the exposure time in a plurality of colors wherein it is possible to effect such an undercorrection. It is a further object of this invention to furnish such an arrangement which is particularly adapted for use with known reproduction arrangements having integrator circuits.

This invention comprises an arrangement for use in apparatus for producing color copies of a color original on photosensitive material. It comprises illuminating means for illuminating said photosensitive material through said color original starting at an exposure starting time. Photoelectric transducing means, one for each color, produce a photocurrent corresponding to the light illuminating said photosensitive material in a corresponding color. Integrator means integrate each of said photocurrents, each of said integrator means thus furnishing a color signal corresponding to the total light having impinged on said photosensitive material in a corresponding color since said exposure starting time. The integrator means are interconnected in such a manner that an average signal, corresponding to the average value of said color signals is derived therefrom. The illumination in any given color is terminated in dependence on both the corresponding color signal and said average signal, whereby changing the relative dependence upon said corresponding color signal and said average signal respectively effects a change in degree of undercorrection. To note only the extreme positions, if the illumination is terminated in dependence solely on the corresponding color signal, a complete correction according to the neutral gray principle takes place. If the illumination is terminated in dependence upon said average signal only the illumination in all three colors will be terminated simultaneously, corresponding to no correction.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The FIGURE shows a simplified circuit diagram of an arrangement according to this invention.

DESCRIPTION OF THE PREFERRED EMBODIMENT

The preferred embodiment will now be described with reference to the FIGURE. In the FIGURE, reference numerals 1, 2 and 3 refer to three secondary electron multipliers, each of which receives light corresponding to one of the three basic colors, for example blue, green and red. The arrangements for furnishing the corresponding light components to each of the secondary electron multiplier tubes is well known, not a subject of this invention, and therefore not further described herein.

The anodes of the three secondary electron multipliers are connected to the positive terminal of a conventional power supply via a common line 4. Capacitors 5, 6 and 7 each have one terminal connected to ground, while their respective second terminals are respectively connected to the ninth dynode 1*a*, 2*a* and 3*a* of the corresponding secondary electron multiplier. Normally open contacts 8*a*, 8*b* and 8*c* of a relay 8 which will be further described below are connected in parallel with capacitors 5, 6 and 7 respectively.

The arrangement according to this invention may equally well be embodied in a circuit wherein each capacitor is connected to the anode of the corresponding secondary electron multiplier.

To return to the embodiment shown in the FIGURE, amplifiers 9, 10 and 11, each connected as a cathode follower each have a grid connected to the common point of one of said capacitors and the corresponding ninth dynode. The cathode of amplifiers 9, 10 and 11 are respectively connected to one terminal of potentiometers 15, 16 and 17 all of whose second terminals are connected to a common line 18. The wiper arms 15*a*, 16*b* and 17*a*, corresponding to potentiometers 15 and 16 and 17 respectively, are connected to the input of comparison means 19, 20 and 21 respectively. The potentiometers thus serve as voltage dividers. Comparison means 19, 20 and 21 may all be embodied in operational amplifiers. Operation amplifiers used for comparison purposes are well known in the art and need not be further described here. Of course these comparison means may also be embodied in flip-flops, in a single tube each, etc. The second input to each comparison means, is supplied via lines 22, 23 and 24 respectively. The reference voltages are furnished by reference voltage source 25 which may furnish a separate voltage for each color, the value of each of said reference voltages depending on the sensitivity and/or the Schwarzschild coefficient of the light-sensitive material in the corresponding color. A possible embodiment of reference voltage source or generator 25 is shown in German Pat. No. 1,046,497. If it is further desired to have a possibility for individually adjusting the exposure time for one color this may also be accomplished by adjusting the corresponding reference voltage level furnished by generator 25. For example three separately adjustable potentiometers, one for the reference voltage corresponding to each color, may be furnished across the output of the reference voltage generator 25.

The activating coils of relays 26, 27 and 28 are respectively connected to the outputs of comparison means 19, 20 and 21. Each of these relays controls a pair of contacts which, upon energization of the corresponding relay, terminate the illumination in the corresponding color. This termination may be accomplished for example by the energization of an electromagnet which attracts a rotatable subtractive filter into the path of the illumination, the return of the filter to the original position at the start of the next exposure being assured by a spring. The relays 26, 27 and 28 further control contacts 26*a*, 27*a* and 28*a* respectively, which contacts are connected in series with the activation coil of an additional relay 8. Activation of relays 26, 27 and 28 respectively thus causes a closing of these three series connected contacts. After all three contacts have closed the relay 8 is activated. The above-described arrangement operates as follows:

Prior to the exposure starting time in any exposure cycle, capacitors 5, 6 and 7 are discharged over contacts 8*a*, 8*b* and 8*c* respectively. These contacts open no later than the exposure starting time of any cycle. The light falling on the cathode of secondary electron multipliers 1, 2 and 3 serving as photoelectric transducing means, thus cause a charging of capacitors 5, 6 and 7 respectively. This charging process will take place at a speed determined by the color density of the original in each color. The capacitors here serve as integrator means. Cathode follower amplifiers 9, 10 and 11 serve to transmit the charging voltage directly to potentiometers 15, 16 and 17 respectively. The only function of the cathode follower circuit is to prevent current flowing through the potentiometers from effecting the charging condition of the capacitors. If the total resistance of each of the potentiometers, used as voltage dividers in the circuit discussed above, is the same as the total resistance of the other potentiometers, then the voltage at the common line 18 at any time during the exposure time period will be equal to the average value of the voltage developed across the three capacitors. If this average voltage, or average signal, is transmitted to comparison means 19, 20 and 21 the, if the reference voltage source 25 furnishes three equal reference voltages, the illumination will be terminated simultaneously in all three colors. This condition exists when the wiper arm 15*a*, 16*a* and 17*a* are all at that extremity of the corresponding potentiometer which is connected to common point 18. Those terminals of the potentiometers connected to common point 18 may also be referred to as the second voltage divider terminals, if the terminals connected to the cathodes of the respective cathode follower tubes are referred to as the first voltage divider terminals. If, however, the wiper arms are all in a position wherein they coincide with said first voltage terminals, then there is no intercoupling between the different color channels since the capacitor voltage is directly applied to the comparison means. Thus any desired degree of undercorrection may be set by means of these potentiometers according to the following equations:

$U_b=U_B(1-k)+k\,U_M$ $U_g=U_G(1-k)+k\,U_M$ whereby $U_M=\frac{1}{3}(U_B+_G+U_R)$ $U_r=U_R(1-k)+k\,U_M$ Here $U_b$, $U_g$, $U_r$ each represent the voltage at the input of corresponding comparison means $U_B$, $U_G$, $U_R$ the voltage at the output of the cathode follower and $k$ is equal to the ratio of that part of the resistance of each potentiometer which is between said first voltage divider terminal and said wiper arm to the total resistance of each of said potentiometers. In order to set all three potentiometers simultaneously to the same value of $k$, mechanical intercoupling between the wiper arms is desirable.

The main advantage of this arrangement is that it is possible by merely turning one knob namely the knob connected to the wiper arms, to adjust the exposure to correspond to an original having either a strong, a weak or no dominant color at all. For the exposure control arrangements known it is necessary to make an adjustment for the degree of undercorrection separately for each of the three colors.

The last pair of contacts in the activating coil circuit of relay 8 closes when the exposure has been completed for the color having the longest exposure time. At this point relay 8 is activated causing contacts 8*a*, 8*b* and 8*c* to close thus causing capacitors 5, 6 and 7 to discharge. However it is important that the voltage values at the capacitors are maintained to the very end of the longest exposure time, since all exposure times are influenced by the voltage values on all of the capacitors, even when the illumination in the color corresponding to a particular capacitor has already been terminated.

A further advantage of the arrangement described above consists in the fact that practice has shown that, within acceptable limits for commercial use, the density of the positive is maintained independent of the chosen undercorrection. This is due to the fact that the influence of the average value of the capacitor voltages does result in a certain equalization among the different color channels.

The invention may also be used in color reproducing apparatus in which only one photoelectric transducing element is used which is illuminated sequentially with the light corresponding to the different colors and whereby a plurality of capacitors is charged sequentially by means of suitable switching apparatus.

While the invention has been illustrated and described as embodied in circuitry using particular types of photoelectric transducers and integrator elements, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended.

We claim:

1. In an apparatus for producing color copies of a color original on photosensitive material, an arrangement for controlling the exposure time in each of a plurality of colors, comprising in combination, illuminating means illuminating said photosensitive material through said color original beginning at an exposure starting time; a plurality of photoelectric transducing means for producing a plurality of photocurrents, each corresponding to the light illuminating said photosensitive material in one of said plurality of colors; a corresponding plurality of integrator means for integrating each of said photocurrents, each of said integrator means thus furnishing a color signal corresponding to the total illuminating energy having impinged on said photosensitive material in the corresponding color since said exposure starting time; means for interconnecting said integrator means with each other in such a manner that an average signal, corresponding to the average amount of illuminating energy impinged on said photosensitive material since said exposure starting time is derived therefrom; and means for terminating the illumination in any given color in dependence on both the corresponding color signal and said average signal.

2. An arrangement as set forth in claim 1 wherein said plurality of colors comprises three colors.

3. An arrangement as set forth in claim 2 wherein each of said integrator means comprise a capacitor, the voltage on said capacitor corresponding to the integral of the corresponding photocurrent; and wherein said interconnecting means comprise three voltage dividers, one for each of said capacitors, each having a first and second voltage divider terminal and a wiper arm, each of said first voltage divider terminals being connected to a corresponding capacitor, all of said second voltage divider terminals connected to a common point, each of said wiper arms being connected to the corresponding terminating means.

4. An arrangement as set forth in claim 3 wherein all of said wiper arms are mechanically intercoupled.

5. An arrangement as set forth in claim 4, also comprising cathode follower means connected between each of said capacitors and the corresponding voltage divider.

6. An arrangement as set forth in claim 5 wherein said terminating means comprise comparison means for comparing the voltage at each of said wiper arms to a corresponding reference voltage and generating a terminating signal for terminating the illumination in the corresponding color when the voltage at a given wiper arm has reached a predetermined value in relation to the corresponding reference voltage; and relay means, one for each of said colors for terminating the exposure in the corresponding color upon receipt of said terminating signal.

7. An arrangement as set forth in claim 6 wherein the value of a particular reference voltage is a function of the Schwarzschild exponent of the light sensitive material in said color.

8. An arrangement as set forth in claim 6 wherein the value of said reference voltage for a given color is a function of the sensitivity of said photosensitive material in said color.

9. An arrangement as set forth in claim 6 wherein each of said comparison means comprises an operational amplifier.

10. An arrangement as set forth in claim 6 also comprising means for discharging all of said capacitors after generation of the last terminating signal.

11. An arrangement as set forth in claim 10 wherein said relay means each have an additional pair of contacts, all said pairs of contacts being connected in series; also comprising addition relay means having an activating coil connected in series with said series connection of contacts, said additional relay means having three pairs of additional relay contacts, each pair so connected to each of said capacitors that closing of said contacts causes said capacitors to be short circuited; and a voltage source connected to said series connection of contact pairs and said activating coil in such a manner that current flows through said activating coil upon closing of all three of said additional relay contact pairs.